(12) United States Patent
Blondal et al.

(10) Patent No.: US 12,077,452 B2
(45) Date of Patent: Sep. 3, 2024

(54) INTERMEDIATE MATERIAL BETWEEN PRECURSOR AND CATHODE ACTIVE MATERIAL

(71) Applicant: Nano One Materials Corpl, Burnaby (CA)

(72) Inventors: Daniel J. Blondal, Burnaby (CA); Stephen A. Campbell, Burnaby (CA); Annabelle Po Yin Wong, Burnaby (CA); O'Rian Reid, Burnaby (CA)

(73) Assignee: Nano One Materials Corp., Burnaby (CA)

(*) Notice: Subject to any disclaimer, the term of this patent is extended or adjusted under 35 U.S.C. 154(b) by 278 days.

(21) Appl. No.: 17/743,932

(22) Filed: May 13, 2022

(65) Prior Publication Data

US 2022/0363563 A1     Nov. 17, 2022

Related U.S. Application Data

(60) Provisional application No. 63/189,334, filed on May 17, 2021.

(51) Int. Cl.
| | |
|---|---|
| *C01G 53/00* | (2006.01) |
| *H01M 4/02* | (2006.01) |
| *H01M 4/505* | (2010.01) |
| *H01M 4/525* | (2010.01) |
| *H01M 10/0525* | (2010.01) |

(52) U.S. Cl.
CPC ............. *C01G 53/52* (2013.01); *C01G 53/50* (2013.01); *H01M 4/505* (2013.01); *H01M 4/525* (2013.01); *H01M 10/0525* (2013.01); *H01M 2004/028* (2013.01)

(58) Field of Classification Search
CPC ........ C01G 53/52; C01G 53/50; C01G 53/54; H01M 4/505; H01M 4/525; H01M 10/0525; H01M 2004/028; H01M 4/1391; C01P 2002/72; C01P 2006/12; C01P 2006/13; Y02E 60/10
See application file for complete search history.

(56) References Cited

FOREIGN PATENT DOCUMENTS

| | | |
|---|---|---|
| CA | 3048267 | 1/2018 |
| CA | 3093557 | 10/2019 |
| WO | WO 2020/232531 A1 | 11/2020 |

OTHER PUBLICATIONS

ISA/CA; International Search Report and Written Opinion prepared for PCT/CA2022/050768; Date mailed: Aug. 9, 2022.
Zhao, et al., The role of precipitant in the preparation of lithium-rich manganese-based cathode materials; Chemical Physics Letters Jun. 12, 2019, vol. 730, pp. 354-360.
Xiao, et al., Synthesis of spinel LiNi0.5Mn1.5O4 as advanced cathode via a modified oxalate co-precipitation method; Ionics Feb. 12, 2016, vol. 22, pp. 1361-1368.
Nasrinpour, Oxalate-assisted solvothermal synthesis of octahedral LiMn1.5Ni0.5O4 particles for lithium-ion batteries; Journal of Materials Research & Development; Apr. 24, 2021.

*Primary Examiner* — Andrew J. Oyer
(74) *Attorney, Agent, or Firm* — Joseph T. Guy; Patent Filing Specialist Inc.

(57) ABSTRACT

A process for forming an active cathode material. The process comprises forming a precursor comprising a lithium salt and a multi-carboxylic acid salt of at least one of nickel, manganese or cobalt; heating the precursor in a metal lined vessel to a temperature of no more than 600° C. to form an intermediate material; and heating the intermediate material to a temperature of over 600° C. to form said active cathode material.

38 Claims, 3 Drawing Sheets

INTERMEDIATE MATERIAL BETWEEN PRECURSOR AND CATHODE ACTIVE MATERIAL

CROSS-REFERENCE TO RELATED APPLICATIONS

This application claims priority to pending U.S. Provisional Patent Appl. No. 63/189,334 file May 17, 2021 which is incorporated herein by reference.

FIELD OF THE INVENTION

The present invention is related to the formation of an intermediate material which is formed after formation of a cathode material precursor and prior to calcining to form a cathode active material. More specifically, the present invention is related to a novel material which can be formed in high volume in a metal lined, preferably rotary, kiln thereby decreasing reliance on a high temperature kiln and ceramic kiln furniture used therein.

BACKGROUND

A recently developed modern process for forming cathode active materials is referred to in the art as the One-Pot process. This process is particularly suitable for the formation of cathode materials, referred to in the art as NMC's, which contain oxides of lithium, nickel, manganese and optionally cobalt in a crystalline lattice and particularly a spinel lattice. The One-Pot process involves the initial formation of organic salts of the lithium and the metals, which are referred to herein as precursors, wherein the precursors are heated to calcination temperature to form the lithium metal oxide which functions as the cathode in a battery.

A particular example of the precursor organic salts includes multi-carboxylic acid salts with oxalate being exemplary without limit thereto. The formation of cathode active materials in this manner, utilizing the precursors, is set forth in commonly assigned U.S. Publ. Patent Application No. 2019/0372120 published Dec. 5, 2019; U.S. Publ. Patent Application No. 2020/0373560 published Nov. 26, 2020 and U.S. Publ. Patent Application No. 2021/00028448 published Jan. 28, 2021 each of which is incorporated herein by reference in their entirety.

During calcining the precursor loses between 50 and 66 wt % of its mass with the loss being predominantly $CO_2$ and water. The $CO_2$ and water displaces the kiln atmosphere which makes control of the oxygen partial pressure throughout the bulk of the powder difficult to control.

Yet another problem associated with precursors, regardless of the origin, is the reliance on high temperature kilns and kiln furniture for use therein. Kiln furniture, such as saggers and the like, are typically manufactured from ceramic materials which must be replaced frequently. Ceramic is necessary, in part, because the typical process of cathode manufacture involves the use of lithium hydroxide as the lithium source. Lithium hydroxide melts early in the heating process and molten lithium hydroxide is extremely corrosive. The molten lithium hydroxide also eliminates the opportunity to use any type of rotary kiln since the molten lithium hydroxide coats and degrades the surface of the kiln. The process has therefore been limited to a stagnant heating process in relatively low volumes with ceramic saggers.

The present invention provides for the formation of an intermediate material, which is formed between the precursor and calcined oxide, wherein the intermediate material can be formed in bulk, in contact with metal, and either isolated or transferred directly to a kiln for calcination. The present invention eliminates many of the problems associated with calcining a precursor to form an active cathode for use in a lithium ion battery.

SUMMARY OF THE INVENTION

The present invention is specific to an improved process for the formation of a lithium ion cathode material and particularly a lithium ion cathode material comprising lithium metal oxides comprising nickel, manganese and optionally cobalt.

A particular feature of the instant invention is the ability to form an intermediate material from a precursor wherein the intermediate material can be formed while in contact with metal thereby significantly decreasing cost and increasing efficiency.

Another particular feature is the ability to form the intermediate material, from a precursor, in large volume with rotary action or agitation, resulting in a fine powder which can be isolated or passed directly to a kiln for further heating to calcification.

A particular advantage of the invention is the ability to form the calcined cathode material from an intermediate material, which is already lithiated, wherein the volume of material added to the kiln, and time required to calcify the intermediate material, is reduced thereby reducing the time at calcification temperature which increases efficiency and improves capital cost per volume of calcined material produced.

Yet another particular advantage is elimination of liquid lithium hydroxide which increases the useful life of kiln furniture.

These and other advantages, as will be realized, are provided in a process for forming an active cathode material comprising:
forming a precursor comprising a lithium salt and a multi-carboxylic acid salt of at least one of nickel, manganese or cobalt;
heating the precursor in a metal lined vessel to a temperature of no more than 600° C. to form an intermediate material; and
heating the intermediate material to a temperature of over 600° C. to form the active cathode material.

Yet another embodiment is provided in a process for forming an active cathode material comprising:
forming a precursor comprising a lithium salt and a multi-carboxylic acid salt of at least one of nickel, manganese or cobalt;
heating the precursor in a first vessel to a temperature of no more than 600° C. to form an intermediate material;
transferring the intermediate material to a second vessel; and
heating the intermediate material in the second vessel to a temperature of over 600° C. to form the active cathode material.

Yet another embodiment a process for forming an active cathode material comprising:
forming a precursor comprising a lithium oxalate and a multi-carboxylic acid salt of at least one of nickel, manganese or cobalt;
heating the precursor in a rotary kiln vessel to a temperature of no more than 600° C. to form an intermediate material; and
heating the intermediate material to a temperature of over 600° C. to form the active cathode material.

Yet another embodiment is provided in an intermediate to an active cathode material having a formula selected from the group consisting of:

$$LiNi_xMn_yCo_zE_wO_4 \quad \text{Formula I}$$

wherein E is an optional dopant; and
x+y+z+w=2 and w≤0.2 and $$LiNi_aMn_bX_cG_dO_2 \quad \text{Formula II}$$

wherein G is an optional dopant;
X is Co or Al; and
wherein a+b+c+d=1 and d≤0.1; and
said intermediate has a surface area of at least 7 m²/g.

DESCRIPTION

Figure 1:
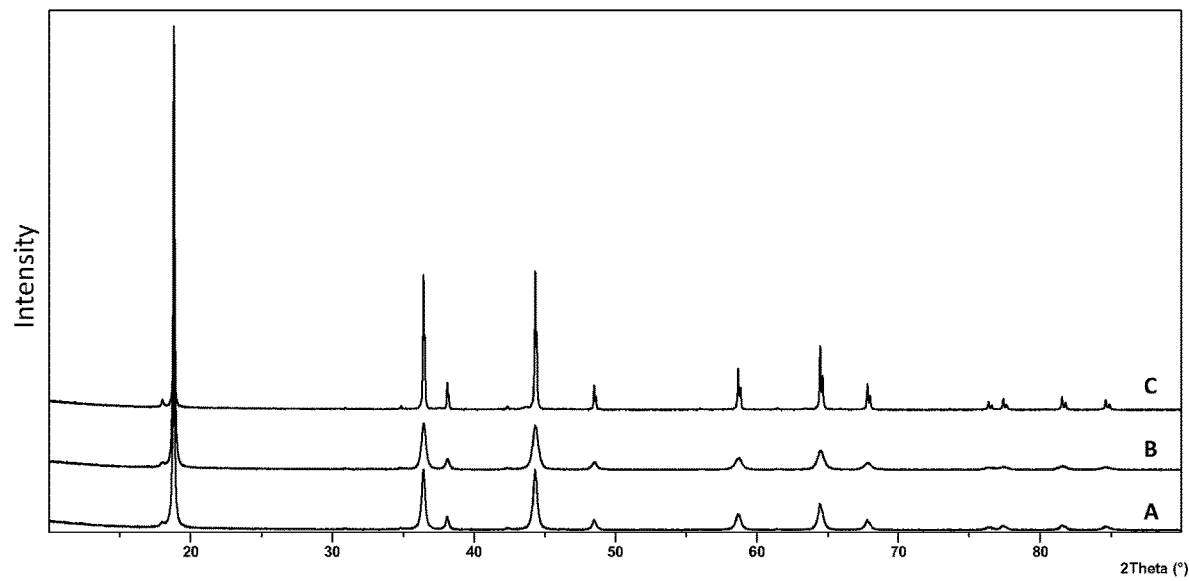
FIG. 1 is a graphical representation illustrating an advantage of the invention.

The present invention is related to an improved method for formation of a cathode active material and the formation of an intermediate material which can be formed in contact with metal. More specifically, the present invention is related to a method of formation of an intermediate material to a cathode active material wherein the intermediate material can be formed in high volume, at lower temperatures and in contact with metal and wherein the precursor can be subjected to rotary action or agitation during heating to form the intermediate material.

Precursors to cathode active material which are formed utilizing multi-carboxylic acid salts, such as oxalic acid, evolve $CO_2$ and water during heating. It has been surprisingly discovered that pre-firing the precursor in air or oxygen at temperatures between 200° C. and 600° C. decomposes the organic salts, such as oxalates without limit thereto, into the preferred lithiated mixed metal oxide. A particular advantage is realized by the incorporation of lithium organic salts, such as lithium oxalate without limit thereto, wherein the lithium organic salts forms the lithium oxide directly without the formation of a liquid phase. The combination of a lower temperature and elimination of a liquid phase comprising lithium allows the initial heating step, at no more than about 600° C., to be executed in the presence of metal and the heating can occur with rotation or agitation thereby resulting in an intermediate material which is a free-flowing powder. Particularly preferred lithium salts include monocarboxylic acid salts and multi-carboxylic salts with lithium acetate and lithium oxalate being exemplary.

After formation of the intermediate material, at no more than about 600° C., the intermediate material powder can be calcined in a more controlled atmosphere to temperatures between 700° C. and 925° C. to form the final cathode active material. A particular advantage provided by the invention is that the intermediate material has a stoichiometry which is close to that of the final cathode material. During the second firing, to form the cathode active material from the intermediate material, there is minimal liberation of volatile components which optimizes kiln utilization.

The intermediate material has less than 10 wt % carbon, more preferably no more than 9 wt % carbon, more preferably no more than 8 wt % carbon, more preferably no more than 7 wt % carbon, more preferably no more than 6 wt % carbon, more preferably no more than 5 wt % carbon. More preferably, the intermediate has no more than 4.5 wt % carbon, even more preferably no more than 4 wt % carbon, even more preferably no more than 3 wt % carbon, even more preferably no more than 2 wt % carbon, even more preferably no more than 1 wt % carbon, even more preferably no more than 0.5 wt % carbon, even more preferably no more than 0.4 wt % carbon, and most preferably no detectable carbon as determined my ASTM E1019-11.

The invention will be described with reference to the figures which form an integral, but non-limiting, component of the disclosure.

Figure 4:
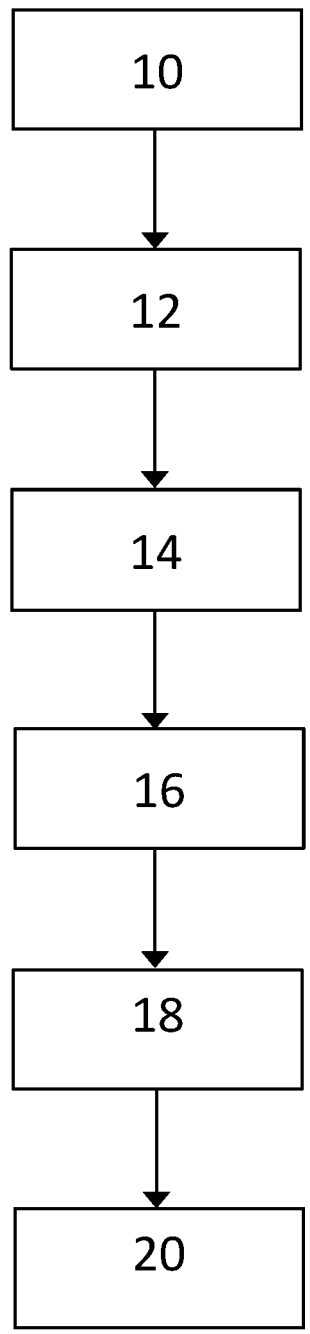
FIG. 4 is a flow chart representation of an embodiment of the invention.

An embodiment of the invention will be described with reference to FIG. 4 wherein the invention is illustrated in a flow chart representation. In FIG. 4, a precursor is formed at 10 wherein the precursor comprises a salt of a metal and a multi-carboxylic acid wherein the metals comprise nickel, manganese and optionally cobalt. The precursor also comprises a lithium salt of a multi-carboxylic acid or lithium carbonate with lithium oxalate being preferred.

The precursor is heated at 12 to no more than 600° C. in a first vessel wherein the precursor is preferably in contact with metal during heating. In an embodiment the surface of the first vessel, which is in contact with the precursor, consist of or is formed of a metal. The metal is not particularly limited herein with any metal currently utilized for forming kiln linings or metal saggers being suitable for demonstration of the invention. Particularly suitable for demonstration of the invention, without limit thereto, are nickel based alloys such as Inconel® alloys including Inconel® 601, Inconel® HX and Inconel® MA 956. In a particularly preferred environment the vessel is a metal lined kiln with a metal lined rotary kiln being particularly preferred. While not limited to theory, it is hypothesized that rotation or agitation of the precursor during firing improves the reaction since the $CO_2$ and water evolution from interior portions of the powder is more efficient and the formation of the kinetically preferred crystalline lattice, which will ultimately be the same as the active cathode material, can more easily form since the movement of the powder minimizes the necessity of metal migration to achieve the desired crystalline lattice. An intermediate product is obtained after heating the precursor in the first vessel for a sufficient amount of time.

The intermediate product is optionally, and preferably, transferred to a second vessel for subsequent heating at 14. A metal lined vessel is less desirable for heating the intermediate product to the degree necessary to form the active cathode component. The intermediate product is heated to a preferred temperature of about 700° C. to 925° C. for a sufficient amount of time to form the active cathode material at 16. Without being limited to theory it is hypothesized that the use of some form of agitation during the initial heating in the first vessel the lithium and metals forms the desired crystalline structure for a cathode active material and therefore the second heating in a second vessel functions to increase the size of the crystals. Since the crystals are already lithiated in the first heating in the first vessel the prior art method of heating for a time sufficient for the lithium to migrate into the lattice is not necessary. After the second heating, in the second vessel, the active cathode material is obtained at 18 and formed into a cathode at 20.

As would be understood, prior art processes utilizing lithium hydroxide cannot be heated in metal due to the melting of lithium hydroxide which is corrosive to metal and which forms agglomerated powder. For the purposes of the present invention the precursor has less than 5 wt % lithium hydroxide, more preferably less than 4 wt % lithium hydroxide, even more preferably less than 1 wt % lithium hydroxide, even more preferably less than 0.1 wt % lithium hydroxide and most preferably no detectable lithium hydroxide.

The metal salts of multi-carboxylic acids can be formed by digesting a digestable metal salt, such as a metal carbonate, or by direct reaction of elemental metal with a multi-carboxylic acid. Multi-carboxylic acids comprise at least two carboxyl groups. A particularly preferred multi-carboxylic acid is oxalic acid due, in part, to the minimization of carbon which must be removed during calcining. Other low molecular weight di-carboxylic acids can be used such as malonic acid, succinic acid, glutaric acid and adipic acid. Higher molecular weight di-carboxylic acids can be used. Particularly preferred are di-carboxylic acids with an even number of carbons due to their higher solubility, however the necessity of removing additional carbons and decreased solubility renders them less desirable. Other acids such as citric, lactic, oxaloacetic, fumaric, maleic and other polycarboxylic acids can be utilized with the proviso they have sufficient solubility to achieve at least a small stoichiometric excess and have sufficient chelating properties. It is preferable that acids with hydroxyl groups not be used due to their increased hygroscopic characteristics.

A particular feature of the invention is the formation of a pre-lithiated salt, as the intermediate material, prior to the calcification process. The lithium salt of the precursor, lithium oxalate as a non-limited example, forms lithium oxide directly in the presence of the metals without the formation of a liquid phase. The lithium is therefore incorporated into the metal salts prior to calcining which improves the efficiency of lithium incorporation.

A particular advantage of the instant invention is the ability to form the intermediate material in a metal vessel preferably with rotation or agitation in a first vessel. In a particularly preferred process the organic salt precursor can be heated in a rotary kiln, as the first vessel, with a high temperature steel tube to produce a homogeneous, free-flowing powder. Since the precursor can be rotated or agitated a larger volume of material can be heated relative to traditional methods involving kilns and relatively static powder. This is possible because the One-Pot process forms lithium oxide directly from an organic metal salt, such as lithium oxalate, which is preferable to the addition of LiOH in the precursor. If LiOH is used in the precursor it would generally melt at the pre-firing temperature and cause the reacts to adhere to the inner surface of the tube. The use of any kiln with agitation while heating, such as a rotary kiln, allows the intermediate material to mix while heating producing a homogeneous material. In contrast, static firing will generally give a range of compositions from top to bottom in the saggar.

The One-Pot process intimately mixes all the reactants together wherein the lithium salt is finely distributed throughout the precursor. This is an improvement over the conventional process which adds the LiOH as a co-mixed fine powder. While not limited to theory it is hypothesized that the organic salts form the desirable lithiated crystal structure during the initial heating. Based thereon, it is hypothesized that the intermediate material, although not perfectly formed into the final active material, has already formed the correct crystal structure and is therefore already lithiated with the $Li^+$ incorporated into the oxide lattice structure. The formation of the desirable crystal structure can occur as low as 200° C. and is complete at 600° C. With the prior art it is hypothesized that the oxide lattice structure is not formed at such low temperatures since the lithium cannot be significantly incorporated in the lattice and therefore the desirable crystal structure cannot form. Therefore, the material that is added to the saggars for the final calcination/crystallization firing and the firing time is already stoichiometric with minimal, or no, further loss of materials which is expected to improve kiln utilization. Decreasing the time at calcining temperature is particularly important when forming the product in $O_2$, such as with high Ni NMC. Since there is a significant reduction in the evolution of $CO_2$ or water, and theoretically none, in the calcining kiln it is easier to maintain the desired $O_2$ partial pressure during the final higher temperature firing.

The intermediate material comprises the desired crystalline structure as discussed elsewhere. It is particularly preferred that the intermediate material comprises at least 50 wt % of a material with a crystal structure in the R3M or Fd3m space group. More preferably, the intermediate material comprises at least 75 wt % of a material with a crystal structure in the R3M or Fd3m space group. Even more preferably, the intermediate material comprises at least 90 wt % of a material with a crystal structure in the R3M or Fd3m space group. Most preferably, the intermediate material comprises at least 99 wt % of a material with a crystal structure in the R3M or Fd3m space group.

It is preferable that the surface area of the intermediate exceeds 7 $m^2/g$, preferably exceeds 9 $m^2/g$, even more preferably exceeds 10 $m^2/g$ and can be up to 45 $m^2/g$. Once the proper crystalline lattice is achieved, and precursors are eliminated, further heating refines the crystallinity and reduces the surface area. Fully sintered material typically has a surface area below about 2 $m^2/g$. It is theoretically possible to achieve full sintering at lower temperature, however, the time required to do so it impractical. Therefore, it is preferable to achieve an intermediate with a high degree of purity and a high surface area for subsequent sintering in a separate step. (CHECK NUMBERS). With prior art processes a fully lithiated material, crystallized in the desired space group symmetry could not be achieved with such a high surface area since the surface area would decrease dramatically during lithiation of the pre-fired material.

Since the intermediate is already in the proper crystalline lattice it is hypothesized that the second heating, to calcining temperatures in a second vessel, refines the crystallinity with a reduction in the surface area. Lithium migration into the lattice has already occurred and presumably the time required at calcining temperature is significantly reduced versus traditional methods. The result is the ability to load an intermediate material that is already nearly stoichiometric into a second vessel, such as a saggar, which optimizes the use of the saggars and kiln and optimizing kiln utilization.

Since the intermediate material is a free-flowing powder the types of kilns suitable for use for calcining extend beyond those currently considered suitable. Therefore, the type of kiln can be selected based upon the scale of operation. Kilns that utilize replaceable saggars are preferred due, in part, to their large installed base including, without limit thereto, muffle kilns, roller hearth kilns or pusher kilns. Rotary kilns are particularly preferred for formation of the intermediate material due to the high throughput and cost relative to use of saggars in kilns.

For the lower temperatures, around 200-400° C. a fluidized bed may achieve the same effect of oxidation and mixing. These systems are expensive and not efficient in their use of energy.

A particularly preferred active cathode material is a spinel crystal structure defined by the Formula I:

$$LiNi_xMn_yCo_zE_wO_4 \quad \text{Formula I}$$

wherein E is an optional dopant;
x+y+z+w=2 and w≤0.2; or
a rock-salt crystal structure defined by Formula II;

$$LiNi_aMn_bX_cG_dO_2 \quad \text{Formula II}$$

wherein G is an optional dopant;
X is Co or Al;
a+b+c+d=1 and d≤0.1.

In a preferred embodiment the spinel crystal structure of Formula I has 0.45≤x≤0.60; 1.40≤y≤1.50 and z≤0.90. More preferably 0.45≤x≤0.55, 1.45≤y≤1.50 and z≤0.05. In a preferred embodiment neither x nor y is zero. In Formula I it is preferable that the Mn/Ni ratio is no more than 3.00, preferably at least 2.33 to less than 3 and most preferably at least 2.60 to less than 3.00.

In a preferred embodiment the rock-salt crystal structure of Formula II is a high nickel NMC wherein 0.50≤a≤0.96, more preferably 0.50≤a≤0.94, even more preferably 0.50≤a≤0.92 and even more preferably 0.58≤a≤0.62 as represented by NMC 622 or 0.78≤a≤0.82 as represented by NMC 811. In a preferred embodiment a=b=c as represented by NMC 111. The term NMCxxx is a shorthand notation used in the art to represent the nominal relative ratio of nickel, manganese and cobalt. NMC811, for example, represents $LiNi_{0.8}Mn_{0.1}Co_{0.1}O_2$.

In the formulas throughout the specification, the lithium is defined stoichiometrically to balance charge with the understanding that the lithium is mobile between the anode and cathode. Therefore, at any given time the cathode may be relatively lithium rich or relatively lithium depleted. In a lithium depleted cathode the lithium will be below stoichiometric balance and upon charging the lithium may be above stoichiometric balance. Likewise, in formulations listed throughout the specification the metals are represented in charge balance with the understanding that the metal may be slightly rich or slightly depleted, as determined by elemental analysis, due to the inability to formulate a perfectly balanced stoichiometry in practice.

Dopants can be added to enhance the properties of the oxide such as electronic conductivity and stability. The dopant is preferably a substitutional dopant added in concert with the primary nickel, manganese and optional cobalt or aluminum. The dopant preferably represents no more than 10 mole % and preferably no more than 5 mole % of the oxide. Preferred dopants include Al, Gd, Ti, Zr, Mg, Ca, Sr, Ba, Mg, Cr, Cu, Fe, Zn, V, Bi, Nb and B with Al and Gd being particularly preferred. Dopants and coating materials may be added as known in the art.

EXAMPLES

A lithium nickel metal oxide in a spinel crystal structure, LNMO, was made using a precursor material comprising oxalate salts of lithium, nickel and manganese. In an inventive example the precursor material was heated in a rotary kiln at 500° C. In a comparative example the same precursor material was heated in a saggar at the same temperature. X-ray diffraction (XRD) patterns for the intermediate material and the final calcined product, heated to 925° C., show the lithiated spinel crystal structure with no sign of impurities. For the intermediate materials the peaks are broader suggesting very small crystals. The peaks grow and sharpen after calcining. The XRD patterns of intermediate material is provided in FIG. 1. In FIG. 1 the XRD pattern of an intermediate material prepared by firing in a sagger for 500° C. for 5 hours is provided as scan A, the XRD pattern for an intermediate prepared by firing in a rotary kiln at 500° C. for 5 hours is provided as scan B and the XRD pattern for a fully calcined LNMO product after calcining at 925° C. is provided in as scan C. As would be realized the XRD indicates that the intermediate material and final calcined LNMO have the same crystalline lattice.

Figure 2:
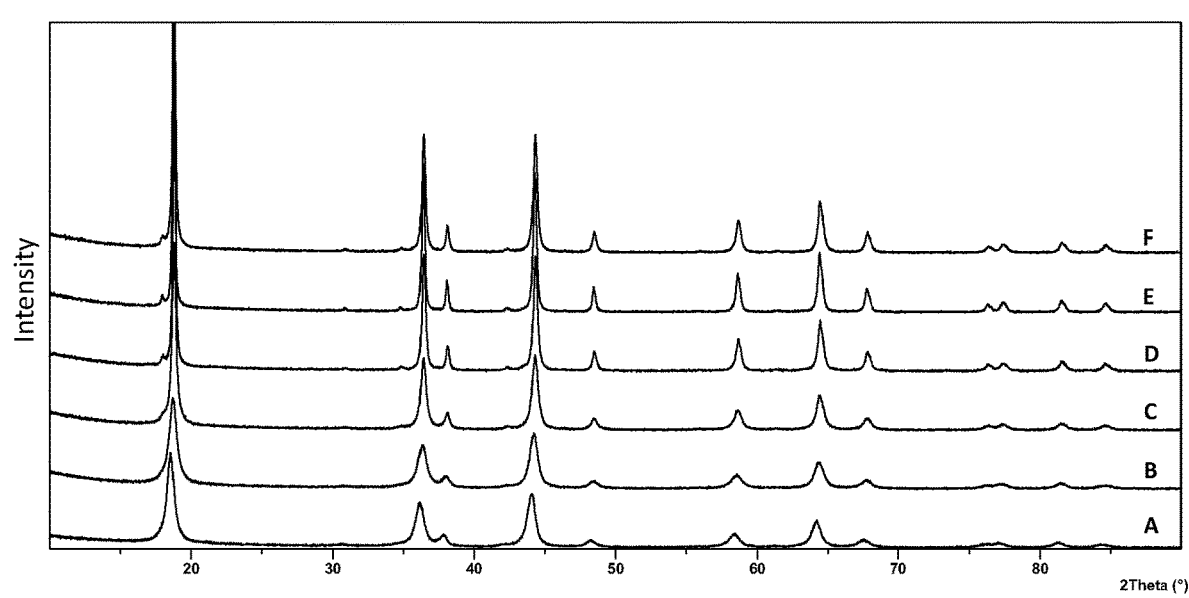
FIG. 2 is a graphical representation illustrating an advantage of the invention.

It is clear that the pure single phase lithiated LNMO is produced at about 500° C. FIG. 2 shows that even after 1 hour at 350° C. the same phase is produced suggesting fast, full lithiation at this low temperature. After final high temperature calcining the peaks become much sharper as the crystals grow. In FIG. 2, the XRD patterns in scans A, B and C are for LNMO after 1, 3 and 5 hours pre-firing at 350° C., respectively and scans D, E, and F are for the LNMO after 1, 3, and 5 hours pre-firing at 500° C., respectively.

As would be understood, the LNMO has a low surface area initially with surface area decreasing with subsequent sintering. A representative LNMO pre-fired at 350° C., which would be fully lithiated as discussed above, would have a surface area of about 38 m²/g and, after sintering at 925° C. for 15 hours, the same sample would have a surface area of about 1.1 m²/g. A similar representative LNMO pre-fired at 500° C. for 5 hours would have a surface area of about 14 m²/g and, after sintering at 925° C. for 15 hours the same sample would have a surface area of about 0.8 m²/g.

Figure 3:
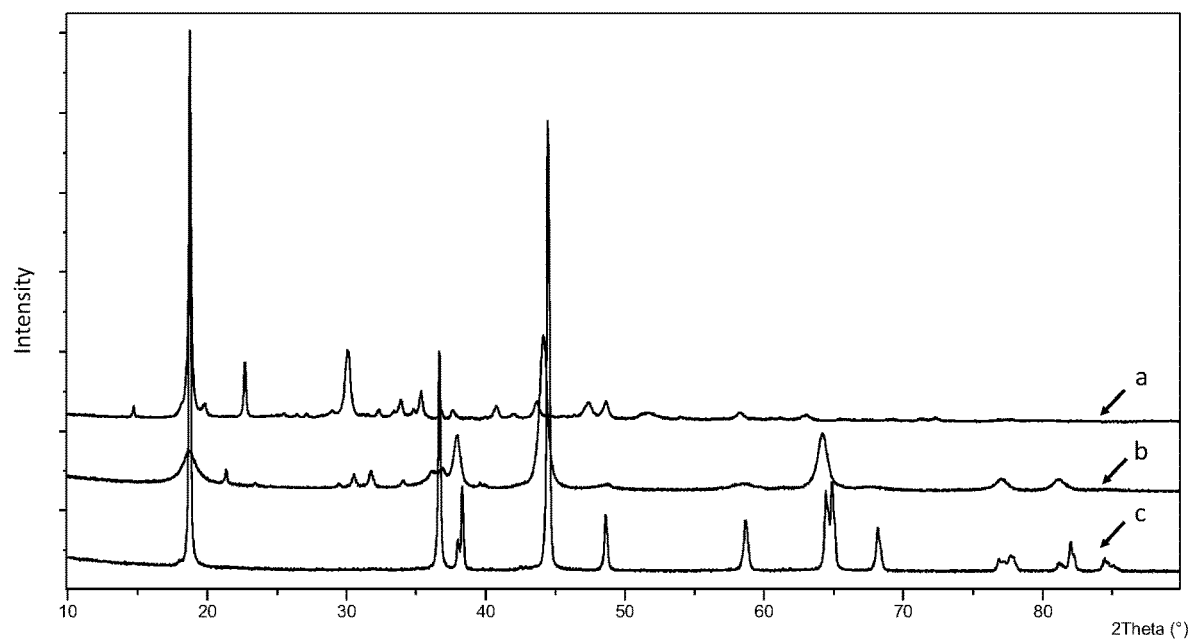
FIG. 3 is a graphical representation illustrating an advantage of the invention.

Formation of NMC 811 having the nominal formula $LiNi_{0.8}Mn_{0.1}Co_{0.1}O_2$ was compared in similar fashion with the final firing in oxygen. In FIG. 3 the XRD patterns for the powder precursor, the pre-fired intermediate material and the final NMC811 are provided in scans a, b and c, respectively. The pre-fired material shows some of the major NMC peaks forming along with traces of $Li_2CO_3$ peaks as impurities. This suggests that lithiation is initiated even at high nickel content. The pre-fired intermediate material would have a surface area of about 23-26 m²/g. The final high temperature firing produces pure, single phase NMC 811 with a surface area of about 0.3-0.5 m²/g.

The precursor may be pre-fired in a rotary kiln with a high temperature steel tube to produce a homogeneous, free-flowing intermediate powder. The advantages are provided by the One-Pot process wherein the Li feedstock, such as $Li_2CO_3$ or LiOH, is converted to lithium oxalate prior to initial firing to form the intermediate material and this differs from conventional processes which present LiOH for firing. Lithium oxalate decomposes to lithium oxide or lithium carbonate at low temperatures whereas LiOH will generally melt at the pre-firing temperature and stick everything to the inner surface of the tube.

The present invention provides significant advantages since lithium oxalate can be fired instead of lithium carbonate or lithium hydroxide which allows for the use of rotary kilns or agitation methods wherein the kiln surface, which is in contact with the material being heated, can be metal instead of ceramic. This provides for a significant advantage with regards to efficiency and cost.

The invention has been described with reference to preferred embodiments without limit thereto. One of skill in the art would realize additional embodiments which are described and set forth in the claims appended hereto.

The invention claimed is:
1. A process for forming an active cathode material comprising:

forming a precursor comprising a lithium salt and a multi-carboxylic acid salt of at least one of nickel, manganese or cobalt;

heating said precursor in a metal lined vessel to a temperature of no more than 600° C. to form an intermediate material; and heating said intermediate material to a temperature of over 600° C. to form said active cathode material.

2. The process for forming an active cathode material of claim 1 wherein said lithium salt is a carboxylic acid lithium salt or a multi-carboxylic acid lithium salt.

3. The process for forming an active cathode material of claim 2 wherein said lithium salt is lithium acetate or lithium oxalate.

4. The process for forming an active cathode material of claim 1 wherein said precursor comprises a least one salt selected from the group consisting of nickel oxalate, manganese oxalate and cobalt oxalate.

5. The process for forming an active cathode material of claim 1 wherein said metal lined vessel comprises a rotary kiln.

6. The process for forming an active cathode material of claim 5 wherein said metal lined vessel comprises a nickel alloy.

7. The process for forming an active cathode material of claim 1 wherein said metal lined vessel is a metal lined kiln.

8. The process for forming an active cathode material of claim 7 wherein said metal lined kiln is a rotary kiln.

9. The process for forming an active cathode material of claim 8 wherein said metal of said metal lined kiln comprises a nickel alloy.

10. The process for forming an active cathode material of claim 1 wherein said active cathode material is selected from the group consisting of:

$$LiNi_xMn_yCo_zE_wO_4 \quad \text{Formula I}$$

wherein E is an optional dopant; and
x+y+z+w=2 and w≤0.2 and $$LiNi_aMn_bX_cG_dO_2 \quad \text{Formula II}$$

wherein G is an optional dopant;
X is Co or Al; and
wherein a+b+c+d=1 and d≤0.1.

11. The process for forming an active cathode material of claim 10 wherein in Formula I; 0.45≤x≤0.60; 1.40≤y≤1.50 and z≤0.90.

12. The process for forming an active cathode material of claim 11 wherein in Formula 1; 0.45≤x≤0.55, 1.45≤y≤1.50 and z≤0.05.

13. The process for forming an active cathode material of claim 11 wherein in Formula I; neither x nor y is zero.

14. The process for forming an active cathode material of claim 10 wherein in Formula I the Mn/Ni ratio is no more than 3.00.

15. The process for forming an active cathode material of claim 14 wherein in Formula I the Mn/Ni ratio is at least 2.33 to less than 3.00.

16. The process for forming an active cathode material of claim 15 wherein in Formula I the Mn/Ni ratio is at least 2.60 to less than 3.00.

17. The process for forming an active cathode material of claim 10 wherein in Formula II wherein 0.50≤a≤0.96.

18. The process for forming an active cathode material of claim 17 wherein in Formula II wherein 0.50≤a≤0.94.

19. The process for forming an active cathode material of claim 18 wherein in Formula II wherein 0.58≤a≤0.62.

20. The process for forming an active cathode material of claim 18 wherein in Formula II wherein 0.78≤a≤0.82.

21. The process for forming an active cathode material of claim 10 wherein said E or said G is selected from the group consisting of Al, Gd, Ti, Zr, Mg, Ca, Sr, Ba, Mg, Cr, Cu, Fe, Zn, V, Bi, Nb and B.

22. The process for forming an active cathode material of claim 21 wherein said E or said G is selected from the group consisting with Al and Gd.

23. The process for forming an active cathode material of claim 1 further comprising transferring said intermediate material to a second vessel after said heating to no more than 600° C.

24. The process for forming an active cathode material of claim 1 wherein said precursor comprises less than 5 wt % lithium hydroxide.

25. The process for forming an active cathode material of claim 24 wherein said precursor comprises no lithium hydroxide.

26. The process for forming an active cathode material of claim 1 wherein at least 50 wt % of said intermediate material has a crystal structure in the R$\bar{3}$m space group or a crystal structure in the Fd$\bar{3}$m space group.

27. The process for forming an active cathode material of claim 26 wherein at least 95 wt % of said intermediate material has a crystal structure in the R$\bar{3}$m space group or a crystal structure in the Fd$\bar{3}$m space group.

28. The process for forming an active cathode material of claim 1 wherein at least 99 wt % of said intermediate material has a crystal structure in the R$\bar{3}$m space group or a crystal structure in the Fd$\bar{3}$m space group.

29. The process for forming an active cathode material of claim 1 wherein said intermediate material has a surface area exceeding 7 m$^2$/g.

30. The process for forming an active cathode material of claim 29 wherein said surface area exceeds 9 m$^2$/g.

31. The process for forming an active cathode material of claim 30 wherein said surface area exceeds 10 m$^2$/g.

32. The process for forming an active cathode material of claim 1 wherein said heating said intermediate product is at a temperature of at least 700° C. to no more than 900° C.

33. The process for forming an active cathode material of claim 1 wherein said intermediate has less than 0.4 wt % carbon.

34. The process for forming an active cathode material of claim 1 wherein said heating of said precursor is in an atmosphere comprising oxygen.

35. The process for forming an active cathode material of claim 1 further comprising forming said precursor by the reaction of a carbonate of at least one of nickel, manganese or cobalt with a dicarboxylic acid.

36. The process for forming an active cathode material of claim 35 wherein said dicarboxylic acid is oxalic acid.

37. The process for forming an active cathode material of claim 1 further comprising forming said precursor by the reaction of at least one of elemental nickel, elemental manganese or elemental cobalt with a dicarboxylic acid.

38. The process for forming an active cathode material of claim 37 wherein said dicarboxylic acid is oxalic acid.

* * * * *